United States Patent
Inagawa et al.

(10) Patent No.: US 12,247,899 B2
(45) Date of Patent: Mar. 11, 2025

(54) EXCITATION DEVICE FOR INSPECTION OF A VEHICLE

(71) Applicant: Honda Motor Co., Ltd., Tokyo (JP)

(72) Inventors: Toshinori Inagawa, Tochigi (JP); Susumu Akutsu, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 566 days.

(21) Appl. No.: 17/604,974

(22) PCT Filed: Apr. 20, 2020

(86) PCT No.: PCT/JP2020/017081
§ 371 (c)(1),
(2) Date: Apr. 7, 2022

(87) PCT Pub. No.: WO2020/218251
PCT Pub. Date: Oct. 29, 2020

(65) Prior Publication Data
US 2022/0412838 A1    Dec. 29, 2022

(30) Foreign Application Priority Data

Apr. 22, 2019 (JP) ............................ 2019-081292
Apr. 24, 2019 (JP) ............................ 2019-082440

(51) Int. Cl.
*G01M 7/02* (2006.01)
*G01M 17/007* (2006.01)

(52) U.S. Cl.
CPC .......... *G01M 7/027* (2013.01); *G01M 17/007* (2013.01)

(58) Field of Classification Search
CPC ... G01M 7/027; G01M 17/007; G01M 17/025
See application file for complete search history.

(56) References Cited

U.S. PATENT DOCUMENTS

2003/0154054 A1* 8/2003 Charette ............. G01M 17/007
  702/188
2010/0058851 A1* 3/2010 Lawrence ............... G01L 5/282
  73/123

FOREIGN PATENT DOCUMENTS

CN  108195599 A   6/2018
JP  S61292035 A  12/1986
(Continued)

OTHER PUBLICATIONS

Horiba Automotive, Horiba ATS Vulcan Chassis Dynamometer, YouTube, Aug. 2010, https://www.youtube.com/watch?v=0gjnaKr932Y (Year: 2010).*

(Continued)

*Primary Examiner* — Eric S. McCall
*Assistant Examiner* — Timothy P Graves
(74) *Attorney, Agent, or Firm* — Duft & Bornsen, PC

(57) ABSTRACT

An excitation device exciting a vehicle by applying a vibration to at least one of a plurality of tires of the vehicle, which includes: a first restricting part arranged in one of a front and rear direction of at least one of the plurality of tires to restrict a movement of the vehicle in the front and rear direction, a second restricting part arranged in another of a front and rear direction of the one of tires to restrict a movement of the vehicle in the front and rear direction, and an actuator configured to be able to drive at least one of the first restricting part and the second restricting part so as to increase or decrease a distance between each other in a front and rear direction of the vehicle.

10 Claims, 13 Drawing Sheets

(56) References Cited

FOREIGN PATENT DOCUMENTS

| | | |
|---|---|---|
| JP | H0219738 A | 1/1990 |
| JP | H05196553 A | 8/1993 |
| JP | H08184524 A | 7/1996 |
| JP | 2007147394 A | 6/2007 |
| JP | 4276572 B2 | 6/2009 |
| JP | 2011163938 A | 8/2011 |
| JP | 2017009545 A | 1/2017 |

OTHER PUBLICATIONS

International Search Report; Application PCT/JP2020/017081; Jun. 30, 2020.
Chinese office action; Application 202080028660.4; May 24, 2023.

\* cited by examiner

FIXED SIDE          MOVABLE SIDE

EXCITATION DEVICE FOR INSPECTION OF A VEHICLE

CROSS-REFERENCE TO RELATED APPLICATION

This application is a National Stage of PCT international application Ser. No. PCT/JP2020/017081 filed on Apr. 20, 2020 which designates the United States, incorporated herein by reference, and which is based upon and claims the benefit of priority from Japanese Patent Application No. 2019-081292, filed on Apr. 22, 2019, and Japanese Patent Application No. 2019-082440, filed on Apr. 24, 2019, the entire contents of which are incorporated herein by reference.

TECHNICAL FIELD

This invention relates to an excitation device, more specifically to a device that excites a vehicle and inspects its durability and interior quietness based on changes in the vibration.

BACKGROUND ART

In this type of an excitation device, for example, a technique described in Patent Literatures 1 and 2 can be cited. The technique described in Patent Literature 1 includes a mounting table on which a vehicle to be inspected is placed, and configured to be provided a flat vehicle support member for supporting the tires of vehicle respectively on the mounting table, the vertical cylinder for driving it in the vertical (Z-axis) direction of vehicle, and the vertical vibrating cylinder for driving the mounting table in the front and rear (X-axis) direction of vehicle.

The technique described in Patent Literature 2 is configured to apply an independent load to the tire of vehicle by providing a load transmission mechanism comprising a large number of links and actuators for transmitting a load by dividing the mounting table on which a vehicle to be inspected is placed into a plurality of sections that can be displaced in a manner independent of each other.

CITATION LIST

Patent Literature

Patent Literature 1: Japanese Unexamined Patent publication No. 2007-147394
Patent Literature 2: Japanese Examined Patent publication No. 4276572

DISCLOSURE OF INVENTION

Problems to be Solved by the Invention

Since Patent Literature 1 requires driving actuators respectively corresponding to different directions for applying a desired excitation to the tire of vehicle as described above, the structure becomes complicated and there is a disadvantage that increases their accommodation space.

Further, Since Patent Literature 2 is configured to include a load transmission mechanism comprising a large number of links and actuators to apply a desired excitation to the tire of vehicle by dividing the mounting table into a plurality of sections which can be displaced in a manner independent of each other as described above, similarly structure is complicated disadvantageously.

Accordingly, an object of the present invention is to solve the above-described disadvantages, and to provide an excitation device that accurately simulates a traveling of a vehicle that is scheduled by applying a desired vibration to the tire of vehicle by changing the distance between the two restricting parts that restrict the movement of the tire in the front and rear direction so as to increase or decrease it.

Means for Solving Problem

According to the present invention, in order to solve the above problem, an excitation device exciting a vehicle by applying a vibration to at least one of a plurality of tires of the vehicle includes: a first restricting part arranged in one of a front and rear direction of at least one of the plurality of tires to restrict a movement of the vehicle in the front and rear direction: a second restricting part arranged in another of a front and rear direction of the one of tires to restrict a movement of the vehicle in the front and rear direction; and an actuator configured to be able to drive at least one of the first restricting part and the second restricting part so as to increase or decrease a distance between each other in a front and rear direction of the vehicle.

DESCRIPTION OF EMBODIMENT

Hereinafter, an inverter type engine generator according to an embodiment of the present invention is explained with reference to attached figures.

First Embodiment

Figure 1:
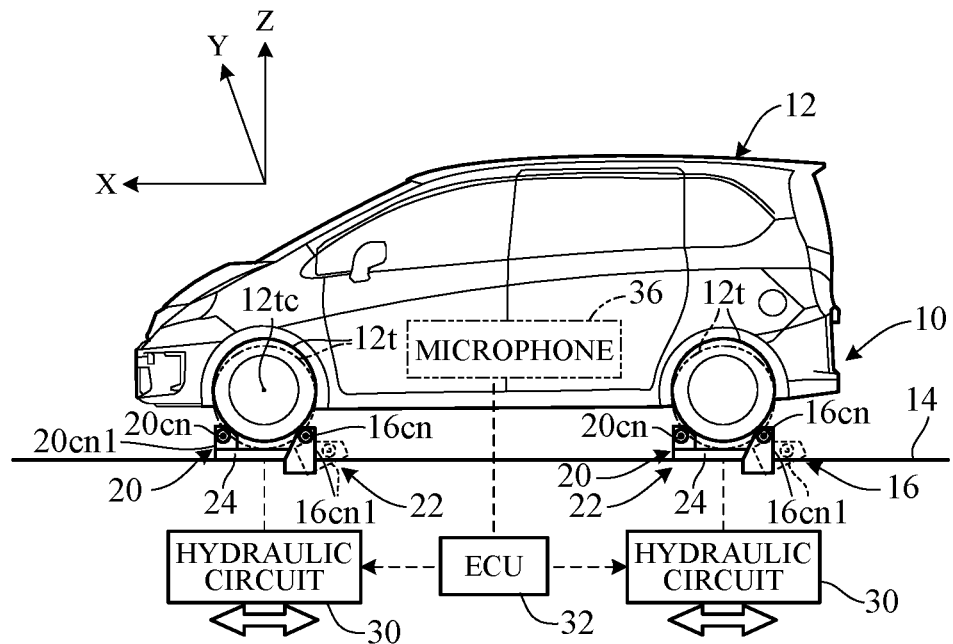
FIG. 1 is a schematic drawing showing an excitation device according to the first embodiment of the present invention as a whole.
Figure 2:
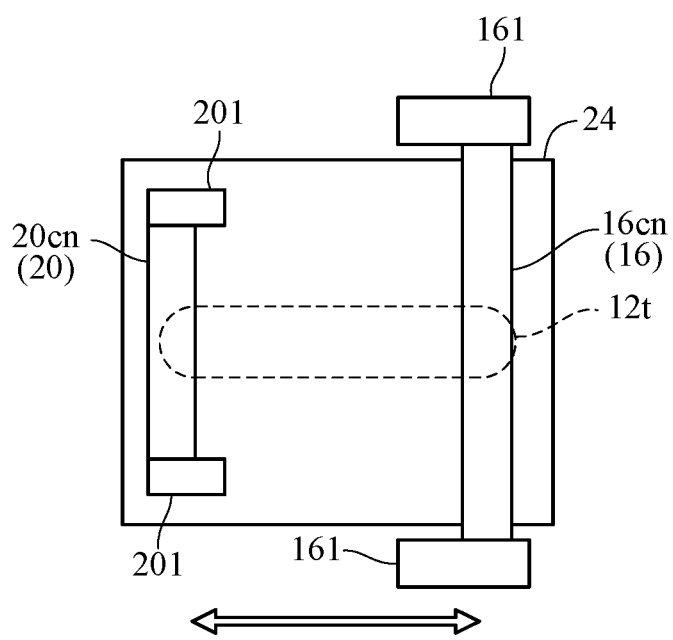
FIG. 2 is a top view of the excitation plate of FIG. 1.
Figure 3:
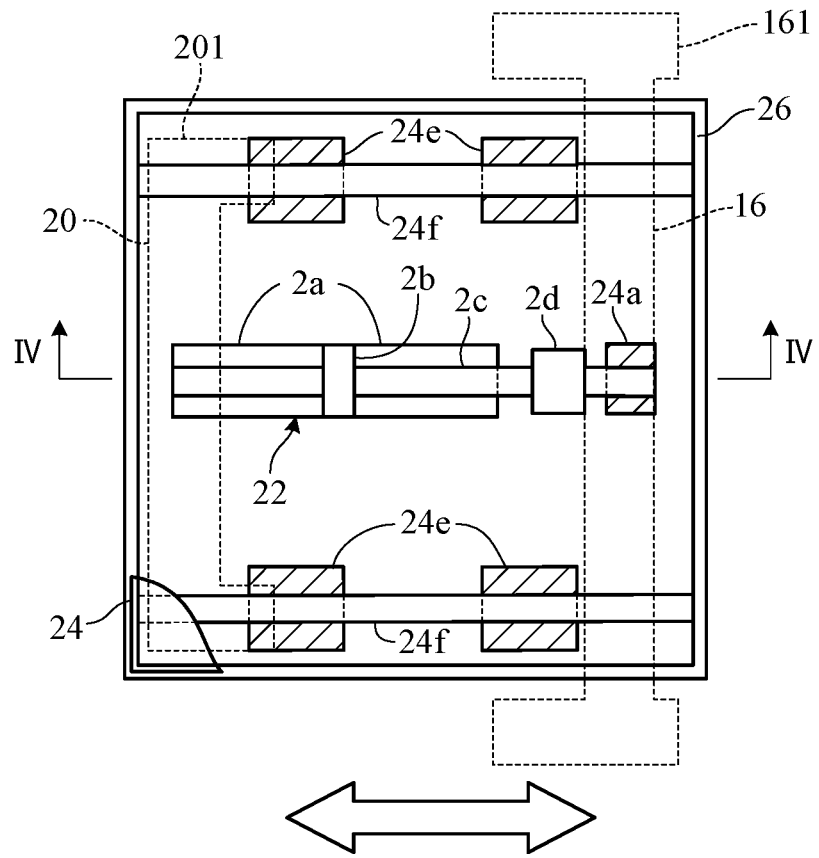
FIG. 3 is an explanatory drawing showing an inner structure of the lower part of the excitation plate of FIG. 2.
Figure 4:
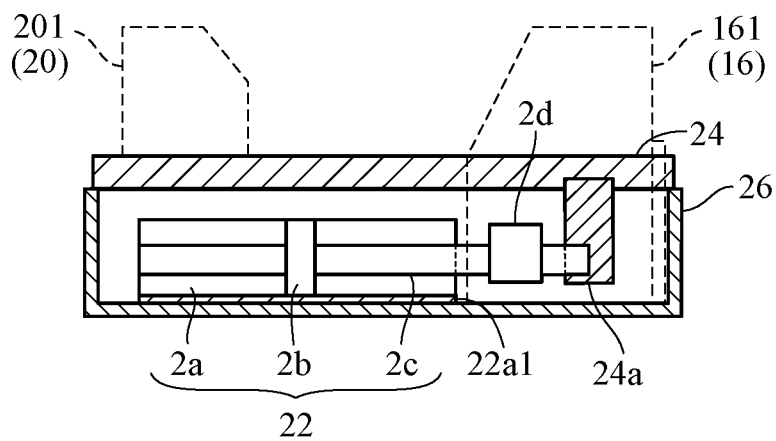
FIG. 4 is a cross-sectional view of IV-IV of FIG. 3.
Figure 5:
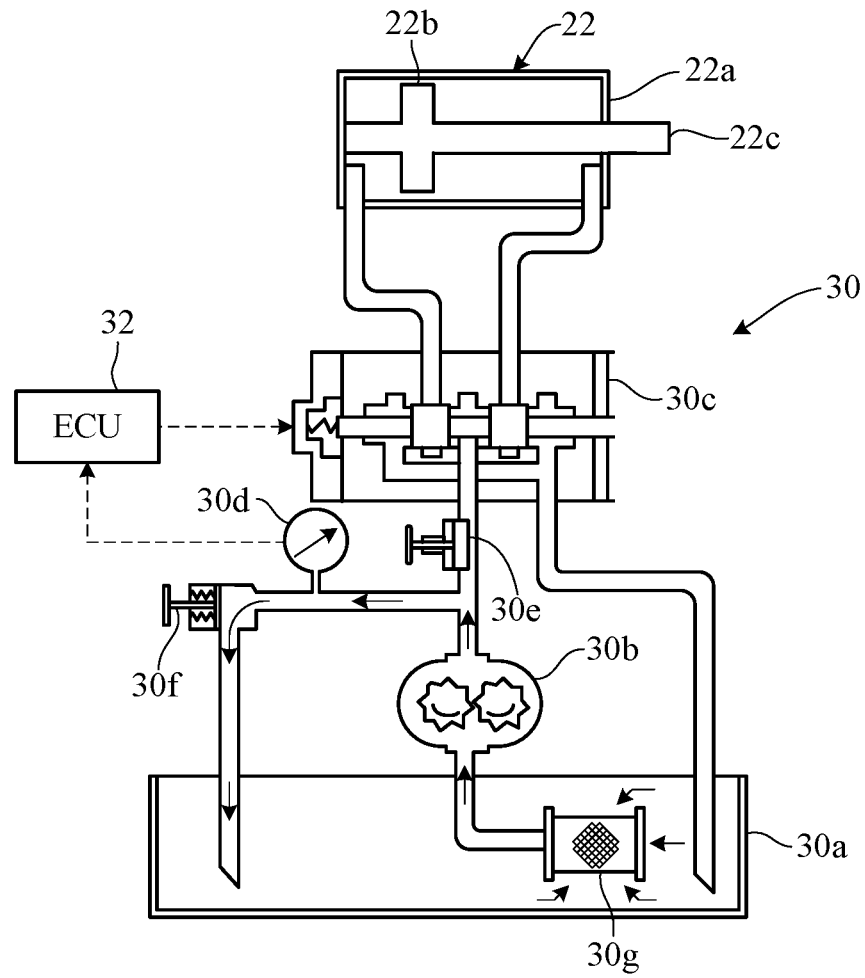
FIG. 5 is a circuit diagram showing the hydraulic circuit of the actuator of the excitation device of FIG. 1.
Figure 6:
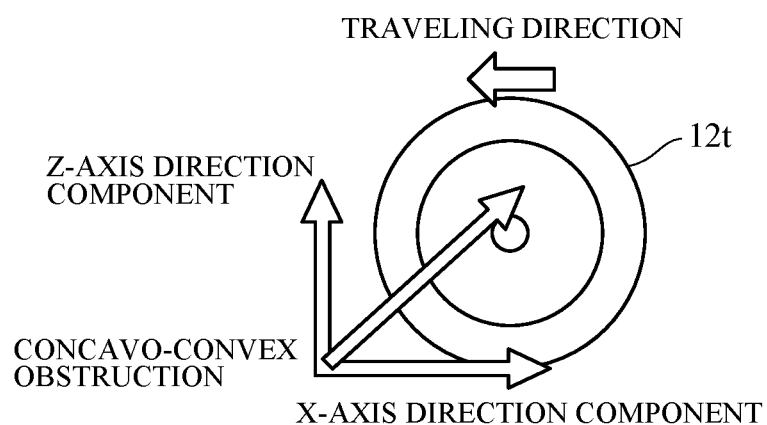
FIG. 6 is an explanatory view explaining an excitation operation of the excitation device of FIG. 1.
Figure 7A:
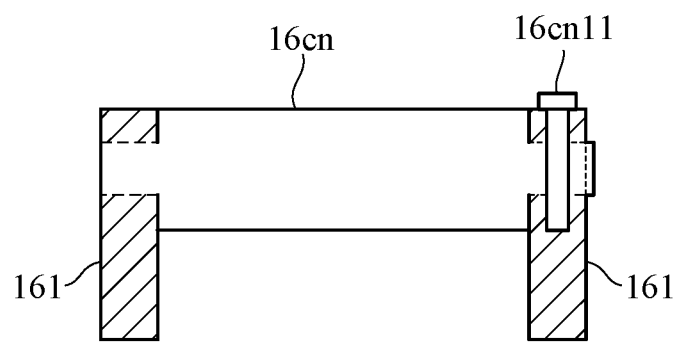
FIG. 7A is an explanatory drawing showing a rotation-inhibiting mechanism of the contact portion of a restricting part of the excitation device of FIG. 1.
Figure 7B:
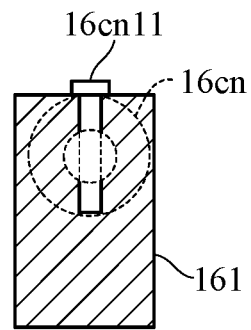
FIG. 7B is also an explanatory drawing showing the rotation-inhibiting mechanism of the contact portion of the restricting part of the excitation device of FIG. 1.

FIG. 1 is a schematic drawing showing an excitation device according to the first embodiment of the present invention as a whole, FIG. 2 is a top view of the excitation plate of FIG. 1, FIG. 3 is an explanatory drawing showing the inner structure of the lower part of the excitation plate of FIG. 2, FIG. 4 is a cross-sectional view of IV-IV of FIG. 3, FIG. 5 is a circuit diagram showing the hydraulic circuit of the actuator of the excitation device of FIG. 1, FIG. 6 is an explanatory view explaining an excitation operation of the excitation device of FIG. 1, FIG. 7A, FIG. 8A, FIG. 7B, and FIG. 8B is an explanatory drawing showing the rotation-inhibiting mechanism of the contact portion of the excitation device of FIG. 1.

Referring to FIGS. 1 to 8C, the excitation device (denoted by reference numeral 10) according to the first embodiment is configured to apply vibrations to at least one tire 12*t*, preferably all tires 12*t*, of the plurality of tires (wheels) 12*t* of vehicle 12 on the mounting table 14 on which vehicle 12 at the time of completion can be placed.

The vehicle 12 is composed of a passenger car, a freight vehicle or the like having a plurality of (e.g., four) tires 12*t*, is operated by the inspector at the time of completion to be stopped (placed) on a mounting table 14. The mounting table 14 is made of a flat rectangular body capable of placing the vehicle 12.

In the embodiments, regarding the direction of the vehicle 12 on the excitation device 10, as shown in FIG. 1, the front and rear (traveling or vehicle length) direction is indicated by the X-axis, the left and right (vehicle width) direction is indicated by the Y-axis, and the vertical (gravitational axis) direction is indicated by the Z-axis.

Specifically, the excitation device 10 includes a first restricting part 16 disposed on one side at least one of the plurality tires 12 for restricting the movement of vehicle 12 in the front and rear direction, a second restricting part 20 disposed on the other side of the front and rear direction for restricting the movement of vehicle 12 in the front and rear direction, and an actuator 22 which can move one of the first restricting part 16 and the second restricting part 20, more specifically, the second restricting part 20 in the front and rear direction of the vehicle 12 so as to increase or decrease the distance against the first restricting part 16.

More specifically, the excitation device 10 is provided with an excitation plate 24 on which the tire 12*t* is placed and which is movable in the front and rear direction of the vehicle 12, and the second restricting part 20 is configured to be attached to the excitation plate 24.

Further, the excitation device 10 includes a ground portion 26 which is fixed to the mounting table 14 in the lower portion of the excitation plate 24, and is configured so that the first restricting part 16 can be attached to the ground portion 26.

The length of the first and second restricting parts 16 and 20 in the vehicle width direction is configured to be equal to or greater than the thickness in the vehicle width direction of the tire 12*t* of the vehicle 12 to be inspected.

The first restricting part 16 and the second restricting part 20 respectively consist of a circular cross-sectional roller, and the contact surface 16*cn* of the first restricting part 16 and the contact surface 20*cn* of the second restricting part 20 in contact with the tire 12*t* are formed thereon. The first restricting part 16 and the second restricting part 20 is rotatably supported by the bearing portions 161 and 201 which are reduced in diameter at both ends. The first restricting part 16 is fixed to the bottom surface of the ground portion 26 via the bearing portion 161, and the second restricting part 20 is fixed to the excitation plate 24 via the bearing portion 201.

The contact surface 16*cn* and the contact surface 20*cn* of the first and second restricting parts 16 and 20 come into contact with the tire 12*t* below the center of gravity of the tire 12*t*, and are configured to be rotatable about an axis parallel to a rotational axis 12*tc* of the tire 12*t*.

Incidentally, one of the first restricting part 16 and the second restricting parts 20, more preferably the first restricting part 16 (more specifically its bearing portion 161) which can be contacted first when the vehicle 12 is moved, as shown in FIG. 1, is configured to be movable in the vertical direction of the vehicle 12 by rolling, and is configured to be facilitate the movement of vehicle 12 when the vehicle 12 moves on the mounting table 14.

Actuator 22 is a one-way driving actuator comprising a single fluid pressure cylinder, specifically a double-acting hydraulic cylinder housed inside the ground portion 26 as shown in FIGS. 3 and 4, and includes a cylinder portion 2*a*, a piston 2*b* slidably accommodated in the cylinder portion 2*a*, and a piston rod (cylinder shaft) 2*c* mounted on the piston 2*b*.

The cylinder portion 2*a* of actuator 22 is fixed to the ground portion 26 via the fixing plate 22*al*, the piston rod 2*c* is fixed to the excitation plate 24 via the excitation plate connecting portion 24*a*, thus at least one of the first restricting part 16 and the second restricting parts 20, more specifically, the second restricting part 20 is configured to be able to drivable so as to increase or decrease the distance between each other the front and rear direction of the vehicle 12. In FIG. 3, a portion of the excitation plate 24 is notched for explanation.

That is, the piston rod 2*c* is fixed to the excitation plate connecting portion 24*a* via the ball joint 2*d*, the excitation plate 24 is moved in the front and rear direction of the vehicle 12 via the excitation plate connecting portion 24*a*, thus the actuator 22 is configured to be drivable in the front and rear direction of the vehicle 12 so as to increase or decrease the distance of the second restricting part 20 attached to the excitation plate 24 from the first restricting part 16.

To smoothly move the excitation plate 24 with respect to the ground portion 26 against the load from the tire 12*t*, the excitation plate fixing part (guide) 24*e* and the load bearing 24*f* inserted therein are provided in the ground portion 26.

The actuator 22 is connected to the hydraulic circuit 30.

Referring to FIG. 5, the hydraulic circuit 30 includes a hydraulic pump 30*b* for pumping and discharging the hydraulic oil from the tank 30*a*, and a servo valve 30*c* interposed between a discharge passage and a drain passage to the tank 30a, and the oil chamber formed on both sides of the piston 2b expands and contracts by being supplied with hydraulic oil through the servo valve 30c, and increases or decreases the distance between the first restricting part 16 and the second restricting parts 20.

The servo valve 30c is connected to an electronic control unit (hereinafter referred to as "ECU") 32, and the driving of actuator 22 is controlled by the ECU 32. The ECU 32 consists of a microcomputer including a processor (CPU) and a memory (ROM, RAM, etc.).

A pressure sensor 30d is disposed in the drain path to generate hydraulic pressure supplied to the cylinder portion 2a, in other words, an output indicating a vibration applied to the tire 12t of the vehicle 12. The output of the pressure sensor 30d is also input to the ECU 32, and the ECU 32 detects an excitation state based on the output.

The ECU 32 detects the change caused in the vehicle 12 by excitation by the actuator 22 to function as a control unit for controlling the operation of the actuator 22 in response to the detected change. Incidentally, in FIG. 5, a reference numeral 30e is a throttle valve, 30f is a safety valve, and 30g is a filter.

That is, vibration data of the vehicle 12 against the time axis expected based on the traveling speed, acceleration and deceleration when the inspector travels the test course such as a Belgian road by driving the vehicle 12 is inputted in the memory of the ECU 32 in advance, and the ECU 32 controls the driving of actuator 22 according to the data to move the second restricting part 20 on the excitation plate 24 in the X-axis direction so as to increase or decrease the distance between the first restricting part 16 and the second restricting part 20.

The distance between the first restricting part 16 and the second restricting parts 20 in an initial state of the inspection is increased, and the tire 12t is placed on the excitation plate 24 as shown by the imaginary line in FIG. 1. The tire 12t of the vehicle 12 is restricted from the front and rear movement by being sandwiched between the first restricting part 16 and the second restricting parts 20 at the inspection position so as to depart from the excitation plate 24 as shown by the solid line in FIG. 1, thus it is not necessary to operate the braking mechanism of the vehicle 12 such as a foot brake at the time of the inspection. Incidentally, the tire 12t of the vehicle 12 may not be away from the excitation plate 24 at the inspection position, since it is not necessary to operate the braking mechanism such as a foot brake of the vehicle 12 if the tire 12t of the vehicle 12 is sandwiched between the first restricting part 16 and the second restricting parts 20.

In that state, the ECU 32 can increase or decrease the distance between the first restricting part 16 and the second restricting parts 20 via actuator 22 to change the vertical height of the tire 12t sandwiched therebetween, thus it is possible to simply realize the vertical vibration of the tire 12t only by the drive of the first restricting part 16 and the second restricting parts 20 in the X-axis direction by the actuator 22.

That is, when the vehicle 12 travels on a test course such as a Belgian road, the vibration is input from two directions consisting of the X-axis direction and the Z-axis direction, more specifically an oblique direction offset with respect to the Z-axis as shown in FIG. 6. However, in this embodiment, it is possible to simply realize the desired vibration only by driving the second restricting part 20 in the X-axis direction.

More specifically, since the second restricting part 20 comes into contact with the tire 12t below its center of gravity position, the tire 12t is displaced obliquely upward in accordance with their drive in the X-axis direction. That is, it is possible to apply longitudinal and vertical vibrations to the tire 12t by a single actuator 22.

At this time, it is also possible to apply a vibration due to roll motion to the vehicle 12 by changing the extension length of the second restricting part 20 in the X-axis direction in each of tires 12t to vary the position of the vertical direction of the left and right tires 12t, and to apply a rotation due to yaw motion by varying the X-axis direction extension length of the second restricting part 20 in the left and right tires 12t of the front wheel side.

Incidentally, as shown in FIGS. 7A, 8A, 7B and 8B, the first and second restricting parts 16 and 20, more specifically at least one of their contact surfaces 16cn and 20cn, for example, an inhibiting mechanism 16cn11 for inhibiting rotation is provided on the contact surface 16cn and is configured to inhibit the rotation about the axis parallel to the rotational axis 12tc of the tire 12t. The inhibiting mechanism 16cn11 may be provided on the contact surface 20cn of the second restricting part 20, or may be provided on both of the first and second restricting parts 16 and 20.

The inhibiting mechanism 16cn11 is composed of a lock pin, and is configured to inhibit rotation of the first contact surface 16cn when in contact with the tire 12t by being manually squeezed by an inspector at the time of inspection.

Figure 8A:
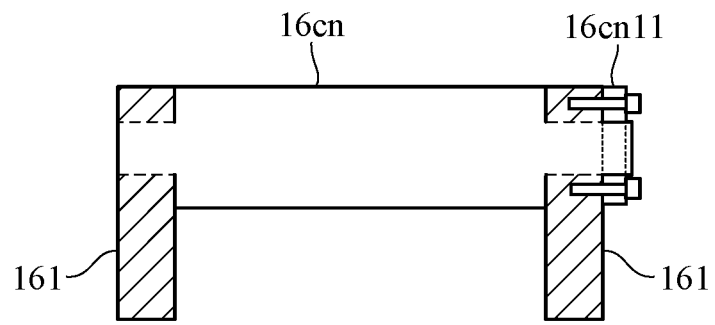
FIG. 8A is another explanatory drawing showing the rotation-inhibiting mechanism of the contact portion of the restricting part of the excitation device of FIG. 1.
Figure 8B:
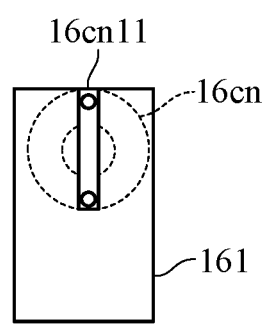
FIG. 8B is also another explanatory drawing showing the rotation-inhibiting mechanism of the contact portion of the restricting part of the excitation device of FIG. 1.
Figure 8C:
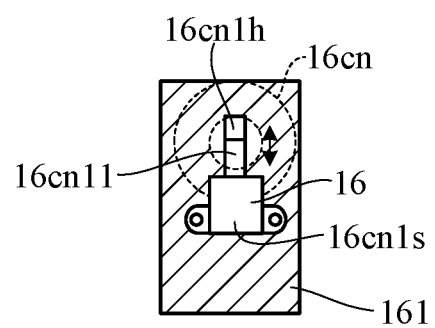
FIG. 8C is also another explanatory drawing showing the rotation-inhibiting mechanism of the contact portion of the restricting part of the excitation device of FIG. 1.

Alternatively, as shown in FIG. 8C, the inhibiting mechanism 16cn11 may be provided with the solenoid 16cn1s, and the inspector may energize the solenoid 16cn1s at the time of inspection, so that the inhibiting mechanism (lock pin) 16cn11 is automatically squeezed in the hole 16cn1h to inhibit the contact surface 16cn from rotating.

As described above, the excitation device 10 according to the first embodiment is configured to include the first restricting part 16 which is arranged in one of the front and rear direction of at least one of the plurality of tires 12t to restrict a movement of the vehicle 12 in the front and rear direction, the second restricting part 20 which is arranged in another of the front and rear direction of the one of tires 12t to restrict a movement of the vehicle 12 in the front and rear direction, and an actuator 22 which can drive at least one of the first restricting part 16 and the second restricting parts 20 so as to increase or decrease the distance from each other in the front and rear direction of the vehicle 12. Therefore, it is possible to accurately simulate the traveling of vehicle that is scheduled by exciting the vehicle 12 by applying vibrations below the center of gravity position of the tire 12t of the vehicle 12 by the one-way driving actuator 22.

Further, it is possible to reliably restrict the front and rear movement of the vehicle 12 by sandwiching the tire 12t of the vehicle 12 with the first and second restricting parts 16 and 20, thus the inspector needs not to actuate the brake device of the vehicle 12 and unnecessary external force is not inputted at the time of inspection.

Incidentally, as shown by an imaginary line in FIG. 1, a microphone 36 is installed in the vehicle compartment of the vehicle 12 as a detector for detecting a change caused in the vehicle 12 by excitation of the excitation device 10, and the output of the microphone 36 may be sent to ECU 32 through the A/D converter. The ECU 32 determines the quietness of the vehicle based on the output of the microphone 36, and when abnormal noise is detected, the ECU 32 determines that a drop or the like of the component caused by the excitation has occurred.

Second Embodiment

Figure 9:
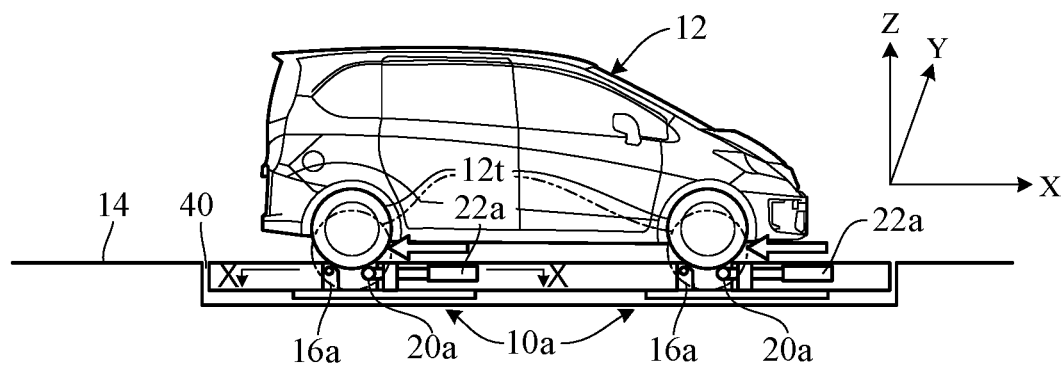
FIG. 9 is a schematic drawing similar to FIG. 1, showing an excitation device according to a second embodiment of this invention.
Figure 10:
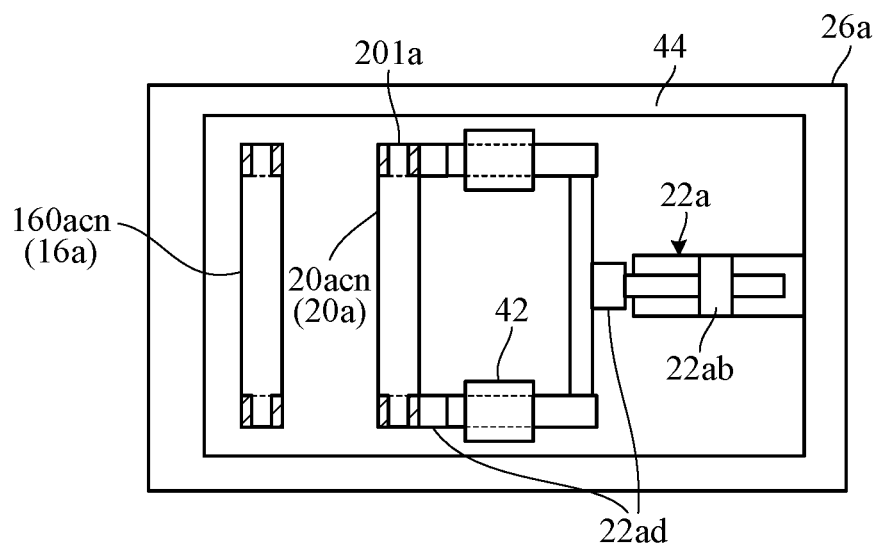
FIG. 10 is a cross-sectional view taken along X-X of FIG. 9.
Figure 11:
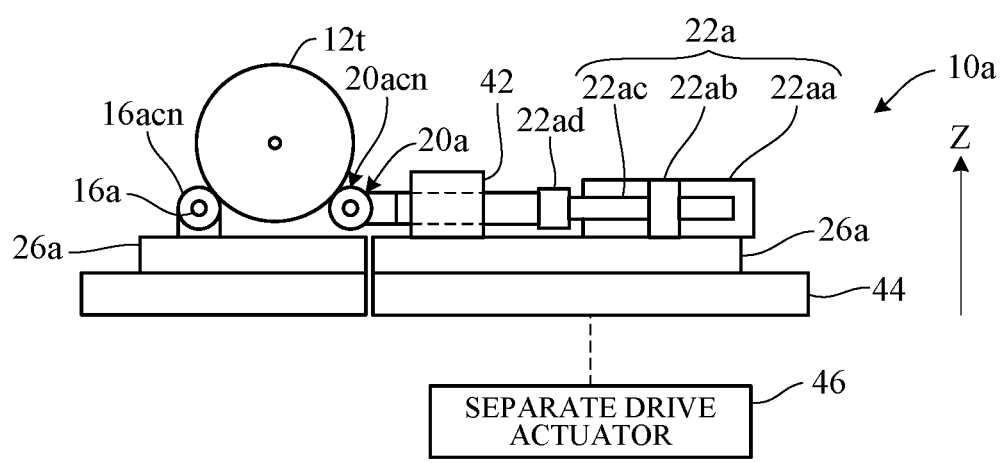
FIG. 11 is a side view of the excitation device of FIG. 10.

FIG. 9 is a schematic drawing similar to FIG. 1, showing an excitation device 10a according to the second embodiment, FIG. 10 is a cross-sectional view taken along X-X of FIG. 9, and FIG. 11 is a side view of the excitation device 10a of FIG. 10. Incidentally, the same members as those of the first embodiment are denoted by the same reference numerals, and when the configurations are different from each other, a suffix a is added thereto, and a description thereof is omitted.

Describing with focus on points different from the first embodiment, the excitation device 10a according to the second embodiment is configured to drill the recess 40 in the mounting table 14, and to include the first restricting part 16 which is arranged in one of the front and rear direction of at least one of the plurality of tires 12t to restrict a movement of the vehicle 12 in the front and rear direction, the second restricting part 20 which is arranged in another of the front and rear direction of the one of tires 12t to restrict a movement of the vehicle 12 in the front and rear direction, and an actuator 22a which can drive at least one of the first restricting part 16a and the second restricting parts 20a, more specifically, the second restricting part 20a so as to increase or decrease the distance from the first restricting part 16 in the front and rear direction of the vehicle 12.

More specifically, the first restricting part 16a is fixed to the ground portion 26a disposed on the plate member 44, and the bearing portions 201a at both ends of the contact surface 20acn of the second restricting part 20a are connected to actuator 22a via the hydrostatic bearings 42 and the ball joints 22ad on the ground portion 26a. Similar to the first embodiment, the actuator 22a comprises a double-acting hydraulic cylinder housed inside the ground portion 26a, and includes a cylinder portion 22aa, a piston 22ab slidably housed in the cylinder portion 22aa, and a piston rod (cylinder shaft) 22ac attached on the piston 22ab.

Thus, at least one of the first restricting part 16a and the second restricting parts 20a is configured to be drivable, more specifically, the second restricting part 20a is configured to be drivable in the front and rear direction of the vehicle 12 so as to increase or decrease the mutual distance from the first restricting part 16a. Incidentally, the first restricting part 16a and the second restricting parts 20a are disposed on the mounting table 14 on which the vehicle is placed so that a height position thereof in the vertical direction of the vehicle 12 is below the floor surface of the mounting table 14.

As shown in FIG. 11, the main portion of the ground portion 26a and the plate member 44 (right half portion in the drawing) is configured separately from the remainder (left half portion in the drawing), and configured to be connected to the same separate drive actuator 46 as the actuator 22a and to be movable in the vertical direction of the vehicle 12.

The first restricting part 16a and the second restricting parts 20a are provided with the contact surface 16acn and the contact surface 20acn similar to the first restricting part 16 and the second restricting parts 20 of the first embodiment, and are provided with the same mechanism as the inhibiting mechanism 16cn11 of the first embodiment, although not shown in the drawings. Further, the actuator 22a is also a one-way driving actuator similar to the actuator 22 of the first embodiment, and it is also not different from the first embodiment that the drive of the actuator 22a is controlled by the ECU 32 in the hydraulic circuit 30.

As described above, the excitation device 10a according to the second embodiment is configured to include the first restricting part 16a which is arranged in one of the front and rear direction of at least one of the plurality of tires 12t to restrict a movement of the vehicle 12 in the front and rear direction, the second restricting part 20a which is arranged in another of the front and rear direction of the one of tires 12t to restrict a movement of the vehicle 12 in the front and rear direction, and an actuator 22a which can drive at least one of the first restricting part 16a and the second restricting parts 20a so as to increase or decrease (vary) the distance from each other in the front and rear direction of the vehicle 12. Therefore, it is possible to accurately simulate the traveling of vehicle that is scheduled by exciting the vehicle 12 by applying vibrations below the center of gravity position of the tire 12t of the vehicle 12 by the one-way driving actuator 22a, the excitation device 10a is small and light weight since the configuration is simple compared to the first embodiment, further an advantage of increasing the durability of device is provided.

That is, although the excitation plate 24 is provided for moving the vehicle 12 in the first embodiment, since the excitation device 10a is configured to apply the pressing force of the second restricting part 20a only to the tire 12t with removing the excitation plate 24 in the second embodiment, the configuration is simple, small and light weight, the durability is also increased.

Further, after performing the inspection by driving the actuator 22a to excite the tire 12t of the vehicle 12, the distance between the first restricting part 16a and the second restricting parts 20a is decreased to raise the tire 12t, so that it is easy to pull out the vehicle 12 from the excitation device 10a and to be move the vehicle 12 outside the mounting table 14.

Further, since the first restricting part 16a and the second restricting parts 20a are disposed on the mounting table 14 so that a height position thereof in the vertical direction of the vehicle 12 is below the floor surface of the mounting table 14, the height position thereof in the vertical direction of the vehicle 12 is below the floor surface of the mounting table 14. Therefore, it is easy to move the vehicle 12 during the inspection. The remaining configuration and effects are not different from those of the first embodiment.

Third Embodiment

Figure 12:
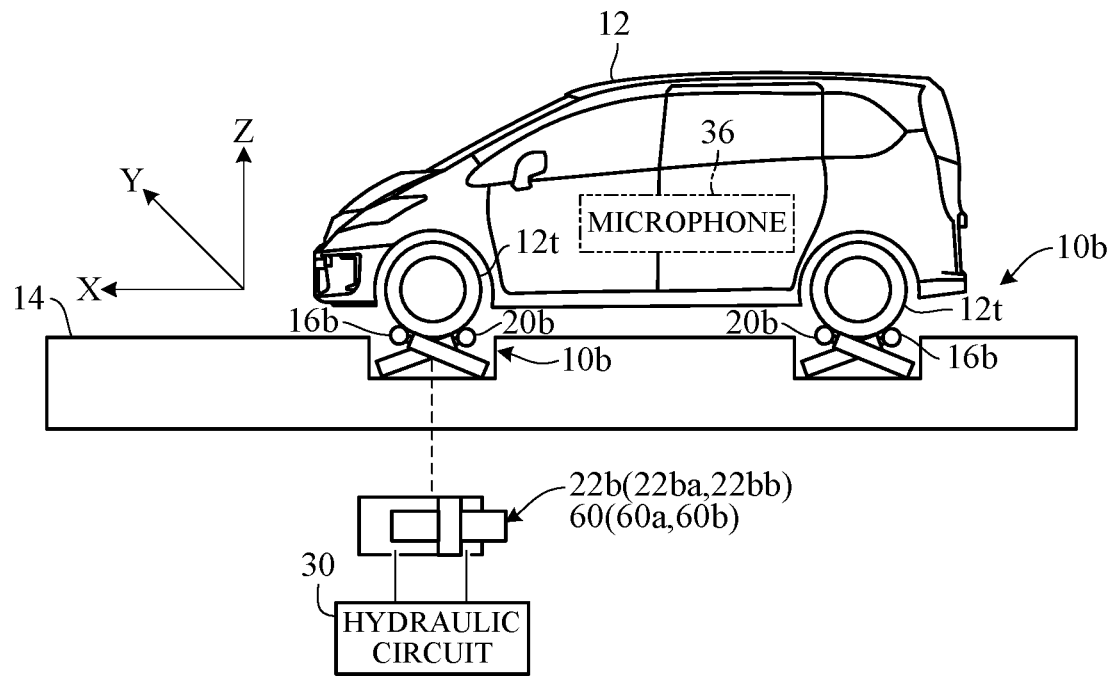
FIG. 12 is a schematic drawing showing an excitation device according to a third embodiment of the present invention, including a vehicle and an excitation mechanism.
Figure 13:
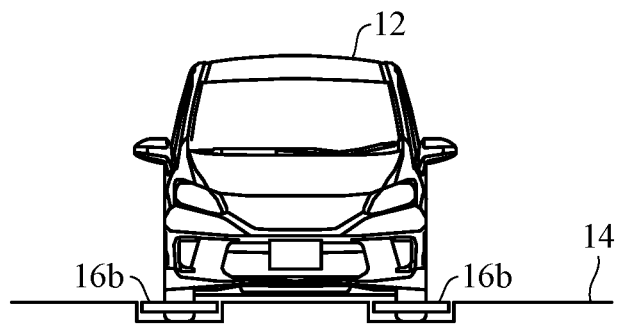
FIG. 13 is a front view of the vehicle of FIG. 12.
Figure 14:
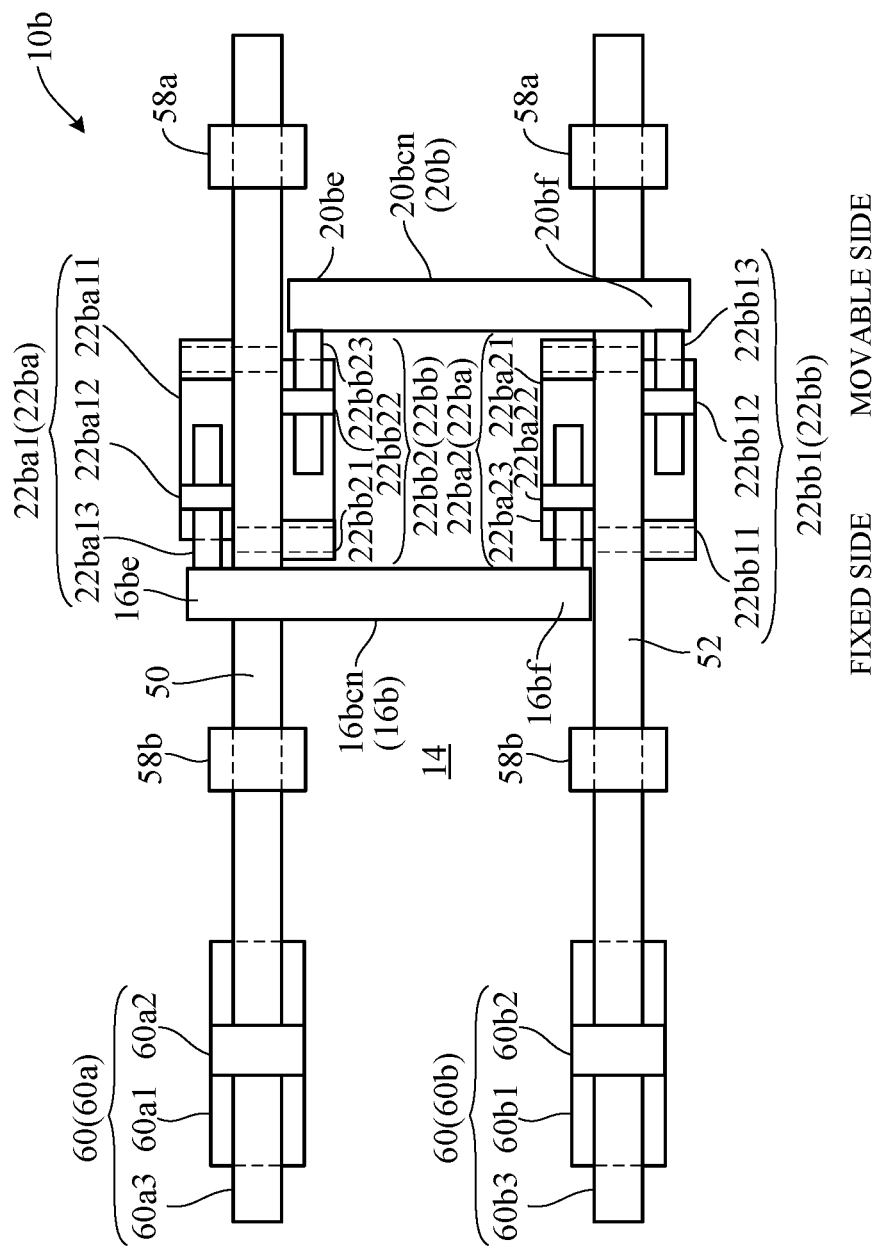
FIG. 14 is a partial cross-sectional top view of the excitation device of FIG. 12.
Figure 15:
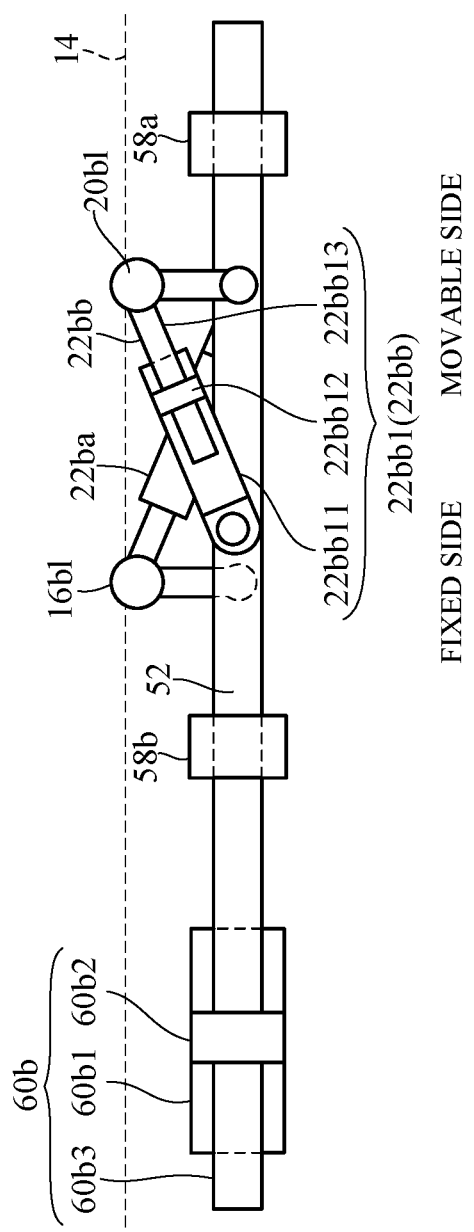
FIG. 15 is a side view of the excitation device of FIG. 14.

FIG. 12 is a schematic drawing showing an excitation device according to the third embodiment of the present invention, including a vehicle, FIG. 13 is a front view of the vehicle of FIG. 12, FIG. 14 is a partial cross-sectional top view of the excitation device of FIG. 12, and FIG. 15 is a side view of the excitation device of FIG. 14. Incidentally, the same members as those of the first embodiment are denoted by the same reference numerals, and when the configurations are different from each other, a suffix b is added thereto, and a description thereof is omitted.

Referring to FIGS. 12 to 15, the excitation device 10b according to the third embodiment, as shown well in FIG. 14, a first restricting part 16b which includes a second shaft (moving guide member) 52 arranged along the front and rear direction of the vehicle 12 similar to the first shaft (moving guide member) 50 arranged along the front and rear direction of the vehicle 12 on the mounting table 14 and is connected to the first shaft 50, a second restricting part 20b which is disposed on the second shaft 52 to face the first restricting part 16b and sandwiching the tire 12t together with the first restricting part 16b, and an actuator 22b which is connected to at least one of the first restricting part 16 and the second restricting part 20, more specifically, both of the first restricting part 16 and the second restricting parts 20 and can drive the first restricting part 16 and the second restricting parts 20 so as to increase or decrease the distance from each other in the front and rear direction of the vehicle 12. Since the vehicle 12 is restricted front and rear movement by being sandwiched between the first restricting part 16*b* and the second restricting parts 20*b* at the inspection position, the brake mechanism such as a foot brake of the vehicle 12 need not be operated by the inspector at the time of the inspection. Further, since the first restricting part 16*b* and the second restricting parts 20*b* are disposed on the mounting table 14 so that a height position thereof in the vertical direction of the vehicle 12 is below the floor surface of the mounting table 14, it is easy to move the vehicle 12 during inspection.

The actuator 22*b*, as shown in FIG. 12, is composed of a first actuator 22*ba* and the second actuator 22*bb*. As shown in FIG. 14, the first restricting part 16*b* includes end portions 16*be* and 16*bf*, and the second restricting part 20*b* includes end portions 20*be* and 20*bf*.

At least one of the first restricting part 16*b* and the second restricting parts 20*b*, in the illustrated example, the first restricting part 16*b* is fixed to the first shaft 50 and the second shaft 52, and the second restricting part 20*b* is connected to the first shaft 50 and the second shaft 52 slidably on the first shaft 50 and the second shaft 52. Thus, the first shaft 50 and the second shaft 52 functions as a member for guiding the front and rear movement of the vehicle 12 of the first restricting part 16*b* and the second restricting parts 20*b*.

The first restricting part 16*b* and the second restricting parts 20*b* have a cylindrical shape, and a first restricting part contact surface 16*bcn* and a second restricting part contact surface 20*bcn* which comes into contact with the tire 12*t* are formed on the first restricting part 16*b* and the second restricting parts 20*b*. The contact surfaces 16*bcn* and 20*bcn* sandwich the tire 12*t* therebetween while smoothly and rotatably coming into contact with the tire 12*t*.

The first actuator 22*ba* and the second actuator 22*bb* respectively are connected to the end portions 16*be* and 16*bf* of the first restricting part 16*b* and the end portions 20*be* and 20*bf* of the second restricting part 20*b* on the inside and outside of the first and second shafts 50 and 52 via links 16*bl* and 20*bl* in a top view so as to be swingable to the first and second shafts 50 and 52.

More specifically, the first actuator 22*ba* includes an outer actuator 22*ba*1 disposed outside the first shaft 50 and an inner actuator 22*ba*2 disposed inside the second shaft 52, the second actuator 22*bb* includes an outer actuator 22*bb*1 disposed outside the first shaft 50 and an inner actuator 22*bb*2 disposed inside the second shaft 52, and they are configured as a one-way actuator connected to the end portions 16*be* and 16*bf* of the first restricting part 16*b* and the end portions 20*be* and 20*bf* of the second restricting part 20*b* via the links 16*bl* and 20*bl*, respectively.

The first shaft 50 and the second shaft 52 includes a first and second hydrostatic bearings 58*a* and 58*b* in the upstream and downstream positions in the front and rear direction of the vehicle 12.

Further, the first shaft 50 and the second shaft 52 are connected to the third actuator 60*a* and the fourth actuator 60*b* at a further upstream position of the second hydrostatic bearing 58*b*.

Thus, the excitation device 10*b*, before the vehicle 12 is placed on the mounting table 14, greatly moves the first restricting part 16*b* and the second restricting parts 20*b* through the third and fourth actuator 60*a* and 60*b* so as to match the position of the respective excitation device 10*b* to the distance of the wheelbase of the vehicle 12 to be inspected in a short time.

As shown in FIGS. 12 and 14, the first and second actuator 22*ba* (22*ba*1, 22*ba*2) and 22*bb* (22*b*1, 22*b*2) and the third and fourth actuator 60*a* and 60*b* respectively are composed of a single fluid pressure cylinder, specifically a hydraulic cylinder, and include cylinder portions 22*ba*11, 22*ba*21, 22*bb*11, 22*bb*21, 60*a*1 and 60*b*1, pistons 22*ba*12, 22*ba*22, 22*bb*12, 22*bb*22, 60*a*2 and 60*b*2 which are slidably accommodated in the cylinder portion 22*ba*11, 22*ba*21, 22*bb*11, 22*bb*21, 60*a*1 and 60*b*1, and piston rods 22*ba*13, 22*ba*23, 22*bb*13, 22*bb*23, 60*a*3 and 60*b*3 which are attached to the pistons 22*ba*12, 22*ba*22, 22*bb*12, 22*bb*22, 60*a*2 and 60*b*2.

Incidentally, in the following description, only the left front tire 12*t* of the four tires 12*t* of the vehicle 12 will be described, but the description thereof applies to the other three tires 12*t* in the same manner.

As shown in FIG. 14, the cylinder portions 22*ba*11, 22*ba*21, 22*bb*11, 22*bb*21, 60*a*1 and 60*b*1 are composed of a double-acting cylinder. The oil chambers formed on both sides of the pistons 22*ba*12, 22*ba*22, 22*bb*12, 22*bb*22, 60*a*2 and 60*b*2 respectively are connected to the hydraulic circuit 30, and expand and contract by being supplied and discharged hydraulic oil from the hydraulic circuit 30 in the same manner as the first embodiment.

The tips of the piston rods 22*ba*13, 22*ba*23, 22*bb*13, and 22*bb*23 of the first and second actuator 22*ba* and 22*bb* extend toward the end portions 16*be*, 16*bf*, 20*be* and 20*bf* of the first and second restricting parts 16*b* and 20*b*, and come into contact with the end portions 16*be*, 16*bf*, 20*be*, and 20*bf*. Therefore, the first and second actuator 22*ba* and 22*bb* drive in the oblique direction between the X-axis direction and the Z-axis direction so that the distance between the first restricting part 16*b* and the second restricting parts 20*b* which are swingably connected to the first and second shafts 50 and 52 via links 16*bl* and 20*bl* in the front and rear direction of the vehicle 12 is increased or decreased (displaced) in accordance with expansion and contraction of the piston rods 22*ba*13, 22*ba*23, 22*bb*13, and 22*bb*23.

The actuator 22*b* in the third embodiment is the same as the actuator 22 of the first embodiment, and it is also not different from the first embodiment that the drive is controlled by the ECU 32 through the hydraulic circuit 30.

As described above, the excitation device 10*b* according to the third embodiment is configured to include the first restricting part 16*b* which is arranged in one of the front and rear direction of at least one of the plurality of tires 12*t* to restrict a movement of the vehicle 12 in the front and rear direction, the second restricting part 20*b* which is arranged in another of the front and rear direction of the one of tires 12*t* to restrict a movement of the vehicle 12 in the front and rear direction, and the actuators 22*b*, that is, the actuators 22*ba*1, 22*bb*1, 22*ba*2 and 22*bb*2 which can drive the first restricting part 16*b* and the second restricting parts 20*b* so as to increase or decrease the distance from each other in the front and rear direction of the vehicle 12. Therefore, it is possible to accurately simulate the traveling of vehicle that is scheduled by exciting the vehicle 12 by applying vibrations below the center of gravity position of the tire 12*t* of the vehicle 12 by the one-way driving actuator 22*b*, and it is possible to easily realize the desired vibration in the Z-axis direction.

Moreover, since the first restricting part 16*b* and the second restricting parts 20*b* are swingably connected to the first and second shaft 50 and 52 via the links 16*bl* and 20*bl*, it is possible to easily and smoothly realize the desired vibration in the Z-axis direction according to the expansion and contraction of the first restricting part 16b and the second restricting parts 20b.

Moreover, since the first and second restricting parts 16b and 20b can reliably restrict the forward and backward movement of the vehicle 12, it is unnecessary for the inspector to operate the braking device of the vehicle 12. Therefore, an unnecessary external force is not input at the time of inspection, so that a good inspection result can be obtained. Further, since the first restricting part 16b and the second restricting parts 20b are disposed near the floor surface of the mounting table 14, the movement of the vehicle 12 during inspection is simplified.

Moreover, the first restricting part 16b and the second restricting parts 20b are disposed along the front and rear direction of the vehicle 12 and movable fixed to the first shaft (moving guide member) 50 and the second shaft (moving guide member) 52 which can move the first and second restricting parts 16b and 20b in the front and rear direction of the vehicle 12. Therefore, in addition to the effects described above, it is easy to move the first and second restricting parts 16b and 20b in the X-axis direction and the inspection of the vehicles wheel base of which is different from each other is easily performed.

Moreover, since the first restricting part 16b and the second restricting parts 20b are disposed on the mounting table 14 so that a height position thereof in the vertical direction of the vehicle 12 is below the floor surface of the mounting table 14, the height position thereof in the vertical direction of the vehicle 12 is below the floor surface of the mounting table 14. Therefore, it is easy to move of the vehicle 12 during the inspection.

Further, since at least one of the first restricting part 16b and the second restricting parts 20b is configured to be movable in the front and rear direction of the vehicle 12 by another actuator (the third actuator 60a and the fourth actuator 60b), it is possible to greatly move, before the vehicle 12 is placed on the mounting table 14, the first restricting part 16b and the second restricting parts 20b through the third and fourth actuator 60a and 60b so as to match the position of the respective excitation device 10b to the distance of the wheelbase of the vehicle 12 to be inspected in a short time.

Incidentally, it is not different from the previous embodiment that, as shown by an imaginary line in FIG. 12, a microphone 36 is installed in the vehicle compartment of the vehicle 12 as a detector for detecting a change caused in the vehicle 12 by excitation of the excitation device 10c, and the output of the microphone 36 may be sent to the ECU 32 through the A/D converter.

Fourth Embodiment

Figure 16:
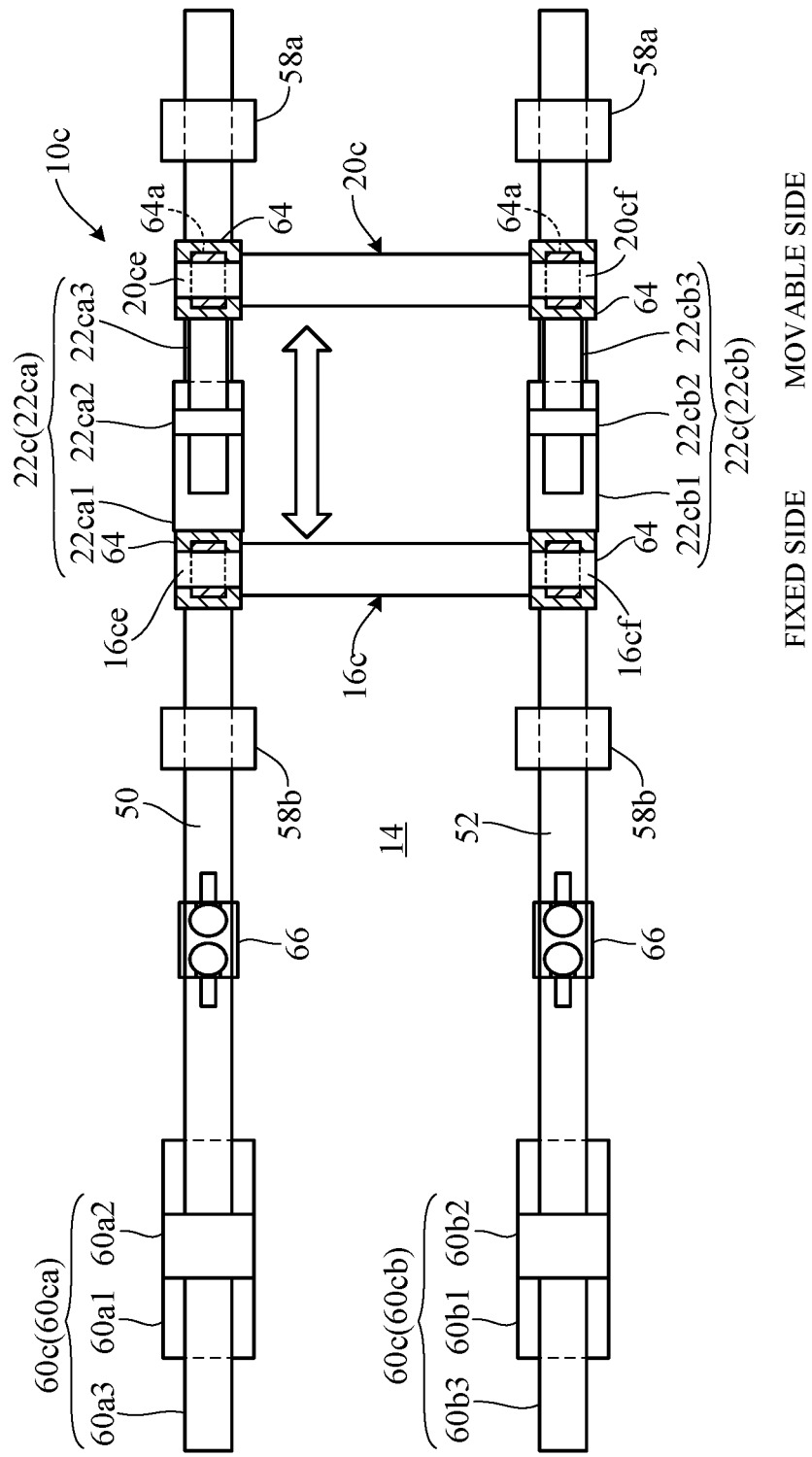
FIG. 16 is partial cross-sectional top views showing an excitation device according to a fourth embodiment of the present invention.
Figure 17:
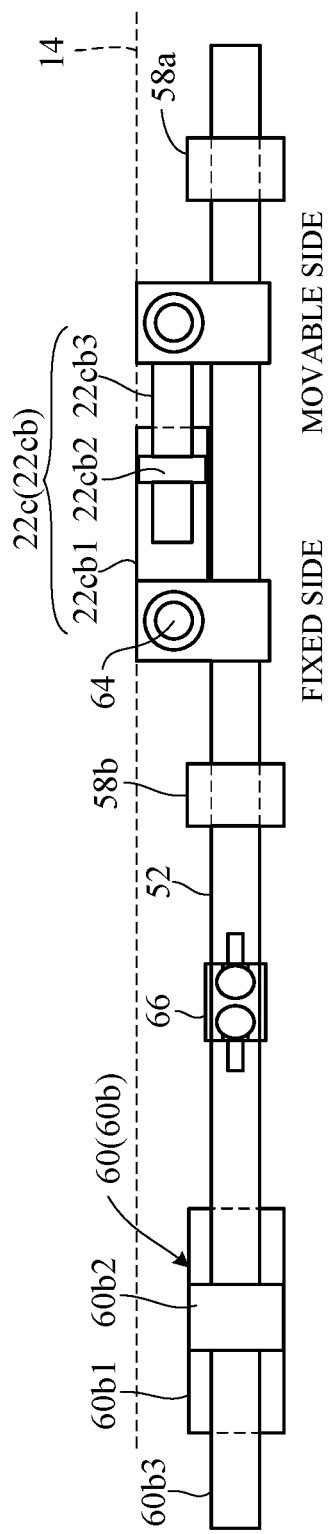
FIG. 17 is a side view of the excitation device of FIG. 16.

FIGS. 16 and 17 are schematic drawings showing an excitation device 10c according to the fourth embodiment of the present invention, similar to FIGS. 14 and 15. Since the fourth embodiment is a modification of the third embodiment, the same members as those of the third embodiment are denoted by the same reference numerals, and when the configurations are different, a suffix c is added thereto, and a description thereof is omitted.

Describing with focus on points different from the third embodiment, an actuator 22c is composed of a first actuator 22ca and the second actuator 22cb, the first actuator 22ca is connected via a spherical bearing 64 to the end portion 16ce of the first restricting part 16c and the end portion 20ce of the second restricting part 20c in the first shaft 50. The second actuator 22cb is also connected via a spherical bearing 64 to the end portion 16cf of the first restricting part 16c and the end portion 20cf of the second restricting part 20c. In the fourth embodiment, the first actuator 22ca and the second actuator 22cb respectively are composed a single fluid pressure cylinder, and the first and second restricting parts 16c and 20c are rotatably connected by the end portions 16ce, 16cf, 20ce and 20cf.

Similar to the third embodiment, the first restricting part 16c is fixed to the first and second shafts 50 and 52, and the second restricting part 20c is slidably connected to the first and second shafts 50 and 52. More specifically, the first restricting part 16c is rotatably fixed to the first and second shafts 50 and 52 so that the distance of the second restricting part 20c with respect to the first restricting part 16c in the front and rear direction of the vehicle 12 increases or decreases on the first and second shafts 50 and 52 disposed on the mounting table 14 in accordance with the expansion and contraction of the piston rods 22ca3 and 22cb3 of the actuator 22c. The first shaft 50 and the second shaft 52 are connected to the third actuator 60ca and the fourth actuator 60cb at a further upstream position of the second hydrostatic bearing 58b. In FIGS. 16 and 17, the reference numeral 66 denotes a connecting member.

As described above, the excitation device 10c according to the forth embodiment is configured to include the first restricting part 16c which is arranged in one of the front and rear direction of at least one of the plurality of tires 12t to restrict a movement of the vehicle 12 in the front and rear direction, the second restricting part 20c which is arranged in another of the front and rear direction of the one of tires 12t to restrict a movement of the vehicle 12 in the front and rear direction, and the actuator 22c which can drive at least one of the first restricting part 16b and the second restricting parts 20b so as to increase or decrease the distance from each other in the front and rear direction of the vehicle 12. Therefore, it is possible to accurately simulate the traveling of vehicle that is scheduled by exciting the vehicle 12 by applying vibrations below the center of gravity position of the tire 12t of the vehicle 12 by the one-way driving actuator 22c, and it is possible to input from two directions consisting of the X-axis direction and the Z-axis direction, more specifically, an oblique direction offset with respect to the Z-axis.

Thus, in the fourth embodiment, it is possible to simply realize the desired vibration including components from the X-axis and the y-axis, that is, the oblique direction with respect to the Z-axis by the actuator 22c driving the first restricting part 16c and the second restricting parts 20c connected to the first shaft 50 and the second shaft 52.

Furthermore, it is also possible to apply the vibration due to the roll motion by varying the change of the vertical direction of the left and right tires 12t, and to apply the vibration due to the yaw motion by varying positions of the front wheel side of tires 12t on the left and right.

Since the excitation device 10c according to the fourth embodiment is configured as described above, it is possible to simply realize the desired vibration including components from the oblique direction with respect to the Z-axis as compared with the third embodiment. Further, since the number of actuators 22c is decrease, the configuration is simple, small and light and the durability is also increased. The remaining configuration and effects are not different from those of the first embodiment.

Fifth Embodiment

Figure 18:
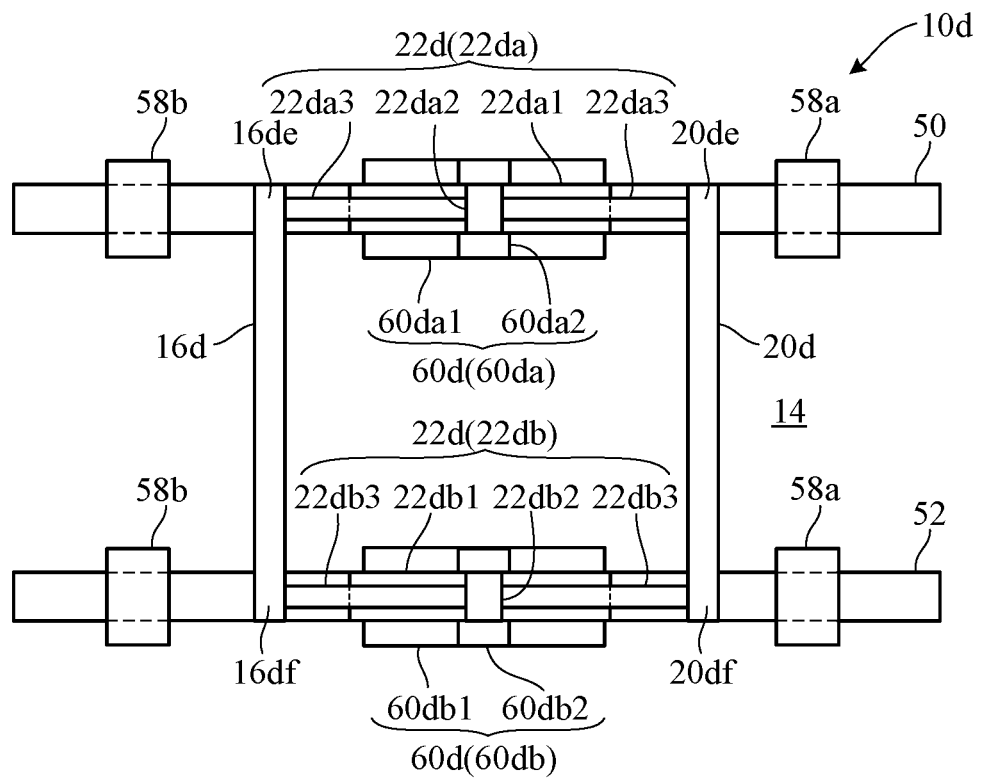
FIG. 18 is partial cross-sectional top views showing an excitation device according to a fifth embodiment of the present invention.
Figure 19:
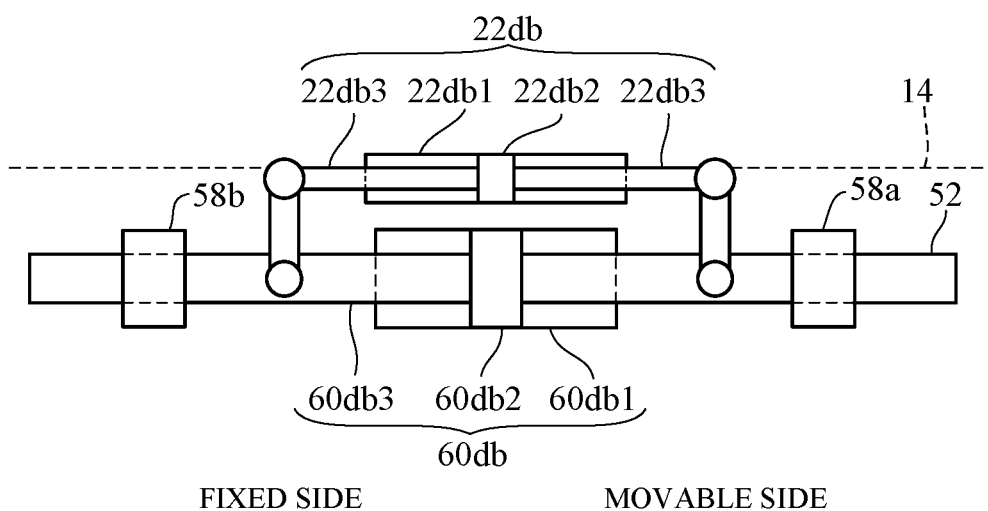
FIG. 19 is a side view of the excitation device of FIG. 18.

FIGS. 18 and 19 are schematic drawings showing an excitation device 10d according to the fifth embodiment of the present invention, similar to FIGS. 14 and 15. Since the fifth embodiment is a modification of the fourth embodiment, the same members as those of the fourth embodiment are denoted by the same reference numerals, and when the configurations are different, a suffix d is added thereto, and a description thereof is omitted.

In the fifth embodiment, the actuator 22*d* is composed of a first actuator 22*da* and the second actuator 22*db*. The piston rods 22*da*3 and 22*db*3 of the first and second actuators 22*da* and 22*db* are two, and respectively are connected to the first restricting part 16*d* and the second restricting parts 20*d* by an end portions 16*de*, 16*df*, 20*de* and 20*df*.

As in the previous embodiment, the first restricting part 16*c* is fixed to the first and second shafts 50 and 52, and the second restricting part 20*d* is slidably connected to the first and second shafts 50 and 52. In addition, the third and fourth actuators 60*da* and 60*db* are disposed at substantially the same position as the first and second actuators 22*da* and 22*db* in the X-axis direction (i.e., directly below the first and second actuators 22*da* and 22*db*).

In the fifth embodiment, as described above, the excitation device 10*d* exciting the vehicle 12 by applying vibration to at least one of the plurality of tires 12*t* of the vehicle 12, is configured to include the first restricting part 16*d* which is arranged in one of the front and rear direction of at least one of the plurality of tires 12*t* to restrict a movement of the vehicle 12 in the front and rear direction, the second restricting part 20*d* which is arranged in another of the front and rear direction of the one of tires 12*t* to restrict a movement of the vehicle 12 in the front and rear direction, and the actuator 22*d* which can drive the first restricting part 16*d* and the second restricting parts 20*d* while keeping the distance from each other so as to sandwich the tire 12*t* of the vehicle 12 to swing it in the front and rear direction. Therefore, it can be easily realized to drive in the desired X-axis direction. In addition, it is possible to prevent, by sandwiching the tire 12*t* between the first restricting part 16*d* and the second restricting parts 20*d*, from an input of an unnecessary external force because of braking for keeping a position of the vehicle 12. Accordingly, it is possible to suppress the enlargement of apparatus caused by the restraint of the tire 12*t* by such restraining means, and it becomes more simple, small and light weight as compared to the third embodiment.

As described above, in the first to fourth embodiments, the excitation devices 10, 10*a*, 10*b* and 10*c* exciting the vehicle 12 by applying vibration to at least one of the plurality of tires 12*t* of the vehicle 12, is configured to include the first restricting parts 16, 16*a*, 16*b* and 16*c* which are arranged in one of the front and rear direction of at least one of the plurality of tires 12*t* to restrict a movement of the vehicle 12 in the front and rear direction, the second restricting parts 20, 20*a*, 20*b* and 20*c* which are arranged in another of the front and rear direction of the one of tires 12*t* to restrict a movement of the vehicle 12 in the front and rear direction, and actuators 22, 22*a*, 22*b* and 22*c* which can drive at least one of the first restricting part and the second restricting part so as to increase or decrease the distance from each other in the front and rear direction of the vehicle 12. Therefore, it is possible to accurately simulate the traveling of vehicle that is scheduled by exciting the vehicle 12 by applying desired vibration below the center of gravity position of the tire 12*t* of the vehicle 12 by the actuators 22, 22*a*, 22*b* and 22*c*.

Moreover, in the first to fifth embodiments, since at least one of the plurality of tires 12*t* is sandwiched between the first restricting part and the second restricting part, it is possible to reliably restrict the forward and backward movement of the vehicle 12. Thus, since it is unnecessary for an inspector to operate the braking device of vehicle 12, an unnecessary external force is not input at the time of inspection. Therefore, it is possible to obtain a good inspection result in addition to the above-mentioned effects. Further, since it does not require restraint in a part of the restraining means of the vehicle 12, it is possible to suppress an enlargement of apparatus.

Moreover, in the first embodiment, the excitation device 10 is provided with an excitation plate 24 on which the tire 12*t* is placed and which is movable in the front and rear direction of the vehicle 12, and the first restricting part 16 or the second restricting part 20 is configured to be attached to the excitation plate 24. Thus, in addition to the above-mentioned effects, it is possible to reliably move the second restricting part 20.

Moreover, in the first embodiment, any one of the first restricting part 16 and the second restricting parts 20, for example, the first restricting part 16 is configured to be movable in the vertical direction of the vehicle 12 by rolling. Therefore, in addition to the above-mentioned effects, it is possible to easily move the vehicle 12 before and after the examination.

Moreover, in the third to fourth embodiments, the first restricting parts 16*b* and 16*c* and the second restricting parts 20*b* and 20*c* are disposed along the front and rear direction of the vehicle 12 and fixed to the moving guide member (the first shaft 50 and the second shaft 52) movable in the front and rear direction of the vehicle 12 so as to be movable. Therefore, in addition to the effects described above, it is easy to move the first and second restricting parts 16*b*, 16*c*, 20*b* and 20*b* in the X-axis direction and the inspection of the vehicles wheel base of which is different from each other is easily performed.

Moreover, in the first to third embodiments, the first restricting parts 16, 16*a* and 16*b* and the second restricting parts 20, 20*a* and 20*b* are respectively included the first restricting part contact surfaces 16*cn*, 16*acn* and 16*bcn* and the second restricting part contact surfaces 20*cn*, 20*acn* and 20*bcn* which come into contact with the tire 12*t*, and at least one of the first restricting part contact surfaces and the second restricting part contact surfaces is configured to be rotatable about an axis parallel to the rotational axis 12*tc* of the tire 12*t*. Therefore, it is possible to apply vibrations similar to those applied to the tire 12*t* during actual traveling of the vehicle 12.

Moreover, in the first to third embodiments, since at least one of the first restricting part contact surfaces 16*cn*, 16*acn* and 16*bcn* and the second restricting part contact surface 20*cn*, 20*acn* and 20*bcn* is include an inhibiting mechanism 16*cn*11 for inhibiting rotation so that the rotation about the axis parallel to the rotational axis 12*tc* of the tire 12*t* is inhibited. Therefore, in addition to the effects described above, the vehicle 12 can easily escape from the space between the first restricting part 16 and the second restricting parts 20 after the inspection.

Moreover, in the fifth embodiment, as described above, the excitation device 10*d* is configured to include the first restricting part 16*d* which is arranged in one of the front and rear direction of at least one of the plurality of tires 12*t* to restrict a movement of the vehicle 12 in the front and rear direction, the second restricting part 20*d* which is arranged in another of the front and rear direction of the one of tires 12*t* to restrict a movement of the vehicle 12 in the front and rear direction, and the actuator 22*d* which can drive the first restricting part 16*d* and the second restricting parts 20*d* while keeping the distance from each other so as to sandwich the tire 12*t* of the vehicle 12 to swing it in the front and rear direction. Therefore, it can be easily realized to drive in the desired X-axis direction, and it is possible to suppress the enlargement of apparatus caused by the restraint of the tire 12*t* by restraining means. Therefore, it becomes more simple, small and light weight as compared to the third embodiment. Incidentally, the actuator 22*d* may be one and the single actuator 22*d* may drive the first restricting part 16*d* and the second restricting parts 20*d* in the same direction by sandwiching the tire 12*t* between the first restricting part 16*d* and the second restricting parts 20*d*.

Moreover, in the first to fifth embodiments, a detector (a pressure sensor 30*d*) that detects changes caused in the vehicle 12 by vibrations applied to the vehicle 12 is provided. Therefore, in addition to the effects described above, vibrations can be applied to the tire 12*t* of vehicle 12 with higher accuracy.

Moreover, in the second to fifth embodiments, the first restricting parts 16*a*, 16*b*, 16*c* and 16*d* and the second restricting parts 20*a*, 20*b*, 20*c* and 20*d* are disposed on the mounting table 14 on which the vehicle 12 is placed so that a height position thereof in the vertical direction of the vehicle 12 is below the floor surface of the mounting table 14. Therefore, the height position thereof in the vertical direction of the vehicle 12 is below the floor surface of the mounting table 14. Therefore, it is easy to move of the vehicle 12 during the inspection.

Further, in the third to fifth embodiments, at least one of the first restricting parts 16*b*, 16*c* and 16*d* and the second restricting parts 20*b*, 20*c* and 20*d* is configured to be movable in the front and rear direction of the vehicle 12 by another actuator (third actuator 60*a* and fourth actuator 60*b*). Therefore, it is possible to greatly move, before the vehicle 12 is placed on the mounting table 14, the first restricting part 16*b*, 16*c* and 16*d* and the second restricting parts 20*b*, 20*c* and 20*d* through the third and fourth actuator 60*a* and 60*b* to match the position of the respective excitation devices 10*b*, 10*c* and 10*d* to the distance of the wheelbase of the vehicle 12 to be inspected in a short time.

Incidentally, although using a fluid pressure (hydraulic) cylinder as the actuator 22 and so on in the first to fifth embodiments, an electric motor or the like may be used. In short, any device that can increase or decrease the distance of the first and second restricting parts 16 and 20 and so on may be used.

INDUSTRIAL APPLICABILITY

The apparatus according to this invention can be optimally used in an apparatus of inspecting durability, quietness in a vehicle, and the like by exciting a vehicle and changing the same.

DESCRIPTION OF REFERENCE SIGNS 10, 10*a*, 10*b* and 10*d* excitation device, 12 vehicle, 12*t* tire, 14 mounting table, 16, 16*a*, 16*b*, 16*c*, 16*d* first restricting part, 20, 20*a*, 20*b*, 20*c*, 20*d* second restricting part, 20*cn*, 20*acn*, 20*bcn*, 20*ccn* contact surface, 22, 22*a*, 22*b*, 22*c*, 22*d* actuator, 22*aa* cylinder portion, 22*ab* piston, 22*ac* piston rod, 22*ba*, 22*ca*, 22*da* first actuator, 22*ca*1, 22*da*1 cylinder portion, 22*ca*2, 22*da*2 piston, 22*ca*3, 22*da*3 piston rod, 22*bb*, 22*cb*, 22*db* second actuator, 22*bb*11, 22*bb*21, 22*cb*1, 22*db*1 cylinder portion, 22*bb*12, 22*bb*22, 22*cb*2, 22*db*2 piston, 22*bb*13, 22*bb*23, 22*cb*3, 22*db*3 piston rod, 24 excitation plate, 26, 26*a* ground portion, 30 hydraulic circuit, 30*d* pressure sensor, 32 ECU (electronic control unit), 36 microphone, 40 recess, 42 hydrostatic bearing, 44 plate body, 46 separate drive actuator, 50 first shaft, 52 second shaft, 58*a*, hydrostatic bearing, 60*a*, 60*ca*, 60*da* third actuator, 60*b*, 60*cb*, 60*db* fourth actuator, 64 spherical bearing, 66 connecting member

The invention claimed is:

1. An excitation device exciting a vehicle by applying a vibration to at least one of a plurality of tires of the vehicle, comprising:
a first restricting part arranged in one of a front and rear direction of the at least one of the plurality of tires to restrict movement of the vehicle in the front and rear direction;
a second restricting part arranged in another of the front and rear direction of the at least one of the plurality of tires to restrict movement of the vehicle in the front and rear direction;
an actuator configured to drive at least one of the first restricting part and the second restricting part to increase or decrease a distance between each other in the front and rear direction of the vehicle; and
the memory stores vibration data of the vehicle against a time axis expected based on a traveling speed, acceleration and deceleration when the vehicle travels a predetermined course, and
the CPU is configured to perform
controlling the actuator according to the vibration data to drive at least one of the first restricting part and the second restricting part to increase or decrease the distance between each other in the front and rear direction of the vehicle.

2. The excitation device according to claim 1, wherein the at least one of the plurality of tires is sandwiched between the first restricting part and the second restricting part.

3. The excitation device according to claim 1 further comprising an excitation plate on which the at least one of the plurality of tires is placed and movable in the front and rear direction of the vehicle, wherein
at least one of the first restricting part and the second restricting part is attached to the excitation plate.

4. The excitation device according to claim 1, wherein the first restricting part and the second restricting part are arranged along the front and rear direction of the vehicle and are fixed to a moving guide member movable to the front and rear direction of the vehicle.

5. The excitation device according to claim 1, wherein the first restricting part and the second restricting part respectively have a first restricting part contact surface and a second restricting part contact surface coming into contact with the at least one of the plurality of tires, wherein
at least one of the first restricting part contact surface or the second restricting part contact surface is configured to be movable about an axis parallel to a rotational axis of the at least one of the plurality of tires.

6. The excitation device according to claim 5, wherein at least one of the first restricting part and the second restricting part includes an inhibiting mechanism inhibiting a rotation so that the rotation about the axis parallel to the rotational axis of the at least one of the plurality of tires is inhibited.

7. The excitation device according to claim 1 further comprising a detector configured to detect a change caused in the vehicle by vibrations applied to the vehicle.

8. The excitation device according to claim 5, wherein the first restricting part contact surface and the second restricting part contact surface are configured to come into contact with the at least one of the plurality of tires below a center of gravity of the at least one of the plurality of tires.

9. The excitation device according to claim 1 further comprising a detector configured to detect a change caused in the vehicle by vibrations applied to the vehicle, wherein the CPU is configured to perform
the controlling including controlling the actuator in response to the change detected in the detector.

10. The excitation device according to claim 1, wherein any one of the first restricting part and the second restricting part is movable in a vertical direction of the vehicle by rolling.

* * * * *